(12) United States Patent
Zhou et al.

(10) Patent No.: US 9,304,214 B2
(45) Date of Patent: Apr. 5, 2016

(54) NEUTRON DETECTION USING A SHIELDED GAMMA DETECTOR

(75) Inventors: Tong Zhou, Sugar Land, TX (US); David Rose, Sugar Land, TX (US); Sicco Beekman, Houston, TX (US); Christian Stoller, Princeton Junction, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 423 days.

(21) Appl. No.: 13/330,211

(22) Filed: Dec. 19, 2011

(65) Prior Publication Data

US 2012/0126106 A1    May 24, 2012

Related U.S. Application Data

(63) Continuation-in-part of application No. PCT/US2011/041929, filed on Jun. 26, 2011.

(60) Provisional application No. 61/360,345, filed on Jun. 30, 2010.

(51) Int. Cl.
*G01T 3/00* (2006.01)
*G01V 5/00* (2006.01)
(Continued)

(52) U.S. Cl.
CPC .. *G01T 3/06* (2013.01); *G01V 5/104* (2013.01)

(58) Field of Classification Search
CPC .................................. G01T 3/06; G01V 5/104
USPC ............................................ 250/269.4–269.8
See application file for complete search history.

(56) References Cited

U.S. PATENT DOCUMENTS

| 3,792,253 A | 2/1974 | Wylie et al. |
| 4,078,174 A | 3/1978 | Goldman |
| 4,387,302 A * | 6/1983 | Givens ........................ 250/269.2 |

(Continued)

FOREIGN PATENT DOCUMENTS

| WO | 2009023437 A2 | 2/2009 |
| WO | 2010135618 A2 | 11/2010 |
| WO | 2012012101 A2 | 1/2012 |

OTHER PUBLICATIONS

Ghanbari et al., "Use of gamma-ray spectroscopy for direct detection of thermal neutrons", May 1, 2001, Journal of Radioanalytical and Nuclear Chemistry, pp. 413-416.

(Continued)

*Primary Examiner* — Casey Bryant
(74) *Attorney, Agent, or Firm* — Michael Dae

(57) ABSTRACT

A tool having a neutron source, a gamma ray detector, and a photomultiplier tube is provided. The gamma ray detector and the photomultiplier tube are at least partially surrounded by a layer of boron. The tool is used to make measurements, and the number of prompt gamma rays emitted by the boron is determined from the measurements. The number of neutrons detected may be inferred using the determined number of prompt gamma rays. The tool may also have a layer of neutron absorbing material different from boron or a layer of heavy metal at least partially surrounding the boron. The tool may be a logging tool used to delineate a porous formation and to determine its porosity. The tool may have a plurality of gamma ray detector/photomultiplier tube pairs and those pairs may be used to determine a formation hydrogen index and/or a borehole hydrogen index.

27 Claims, 16 Drawing Sheets

(51) Int. Cl.
*G01T 3/06* (2006.01)
*G01V 5/10* (2006.01)

(56) References Cited

U.S. PATENT DOCUMENTS

| | | | |
|---|---|---|---|
| 4,445,033 A | * | 4/1984 | Preeg et al. .................. 250/266 |
| 4,600,838 A | | 7/1986 | Steinman et al. |
| 5,021,653 A | | 6/1991 | Roscoe et al. |
| 5,278,758 A | * | 1/1994 | Perry et al. ...................... 702/8 |
| 5,420,422 A | | 5/1995 | Loomis |
| 5,539,225 A | * | 7/1996 | Loomis et al. ............. 250/269.4 |
| 5,608,215 A | | 3/1997 | Evans |
| 5,804,820 A | | 9/1998 | Evans et al. |
| 6,011,266 A | | 1/2000 | Bell |
| 6,124,590 A | * | 9/2000 | Mickael ........................ 250/264 |
| 6,373,066 B1 | * | 4/2002 | Penn ........................ 250/390.11 |
| 6,639,210 B2 | * | 10/2003 | Odom et al. ................ 250/269.6 |
| 7,365,307 B2 | | 4/2008 | Stoller et al. |
| 2002/0170348 A1 | * | 11/2002 | Roscoe et al. ............. 73/152.02 |
| 2010/0193675 A1 | | 8/2010 | Stoller |
| 2011/0272570 A1 | | 11/2011 | Xu et al. |
| 2012/0197529 A1 | | 8/2012 | Stephenson et al. |

OTHER PUBLICATIONS

Office Action issued in EP application 12860431.1 on Sep. 3, 2015, 9 pages.

Supplementary Search Report issued in EP application 12860431.1 on Aug. 3, 2015, 4 pages.

* cited by examiner

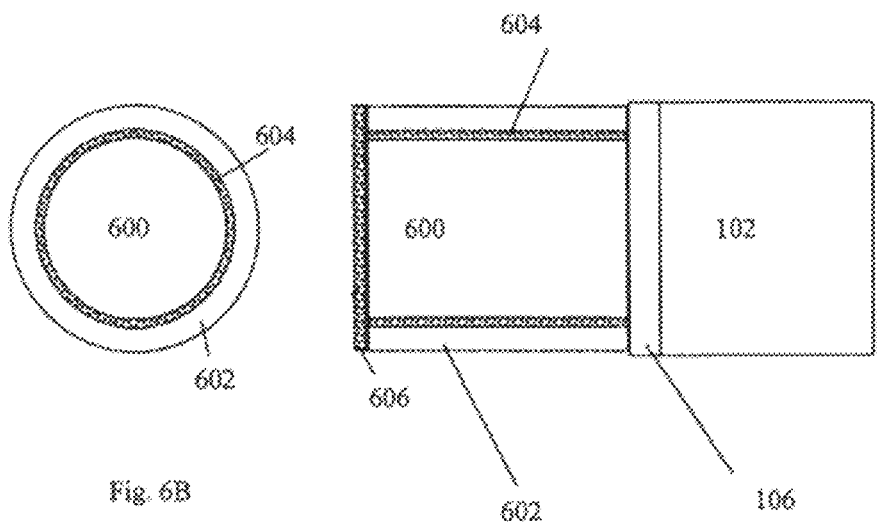
Fig. 6B
Fig. 6A
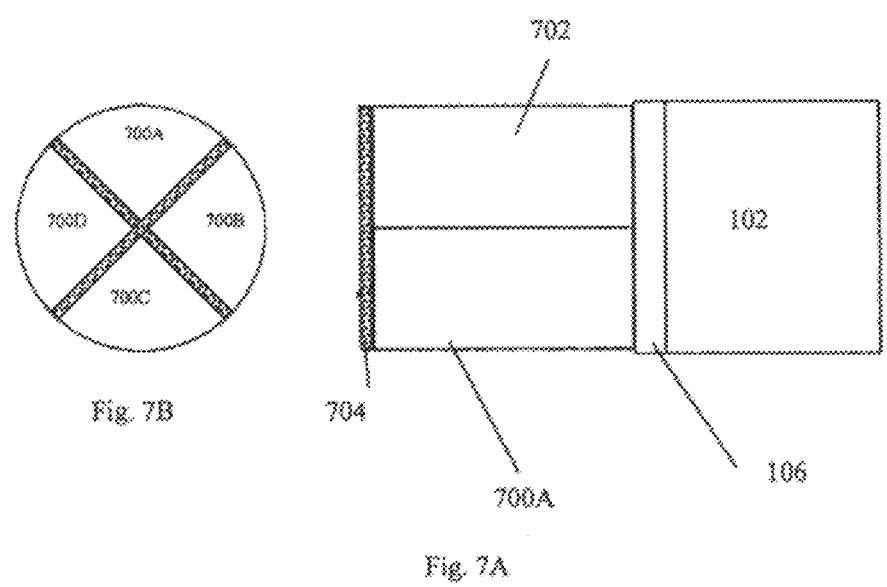
Fig. 7B
Fig. 7A

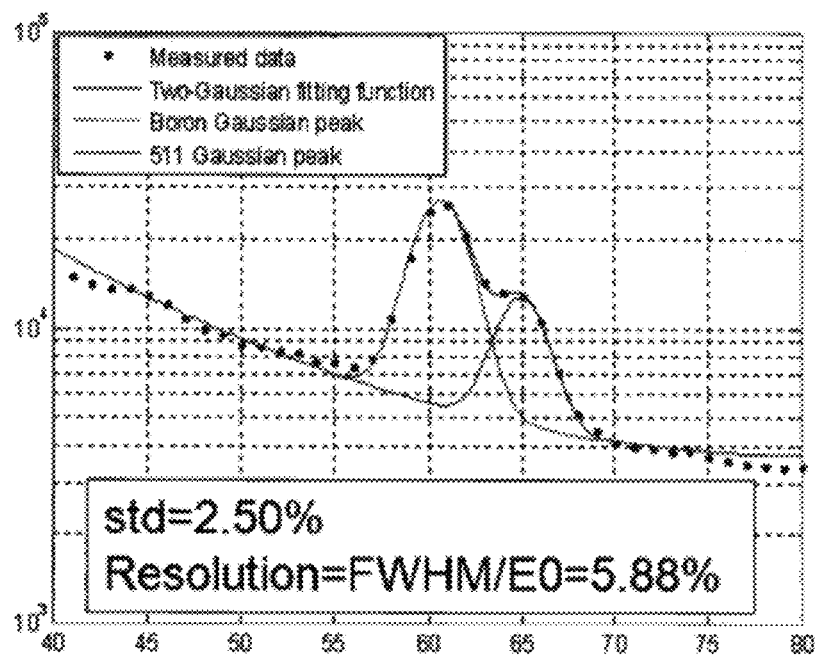
Figure 14
Figure 15
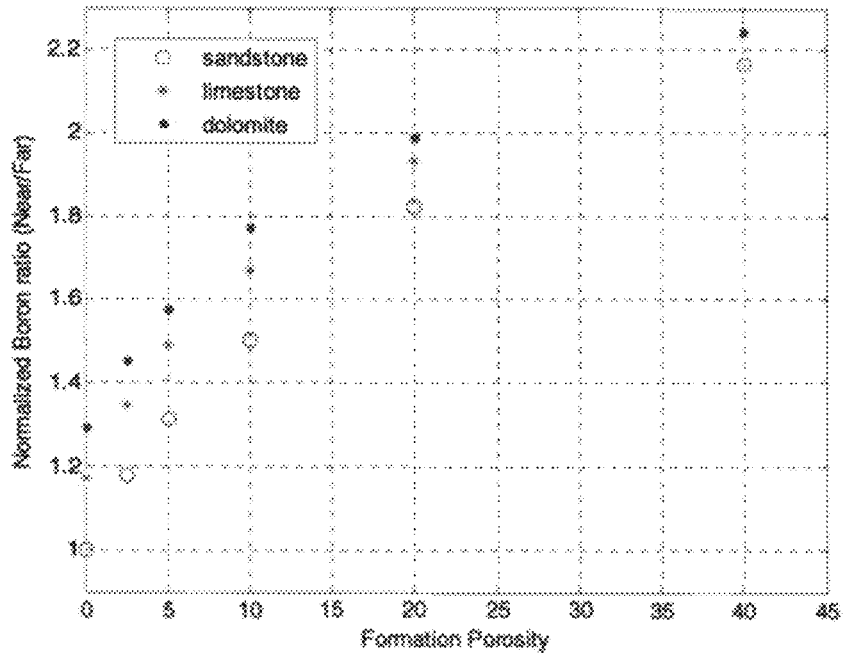

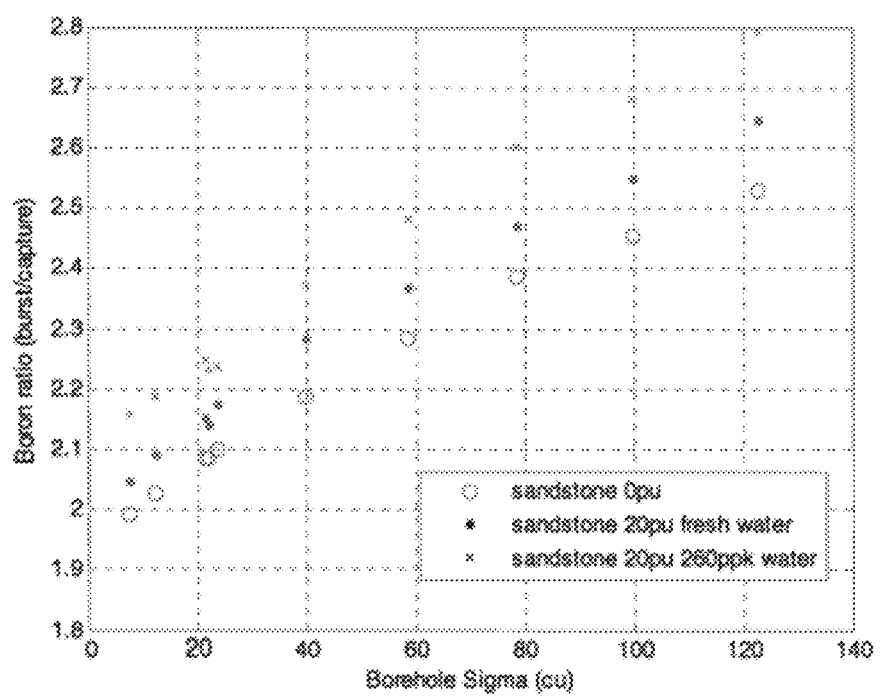

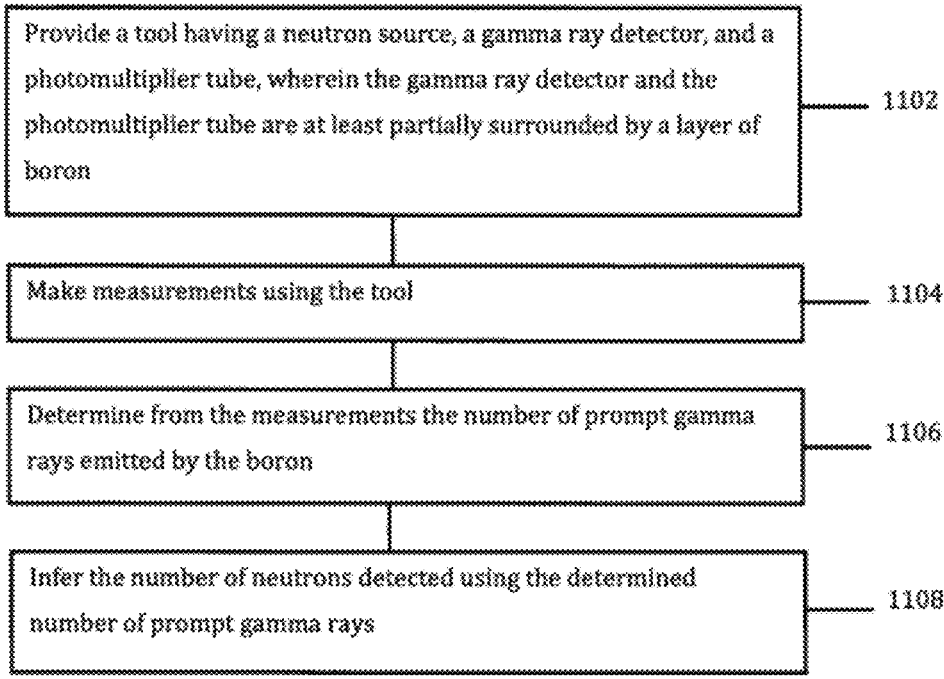

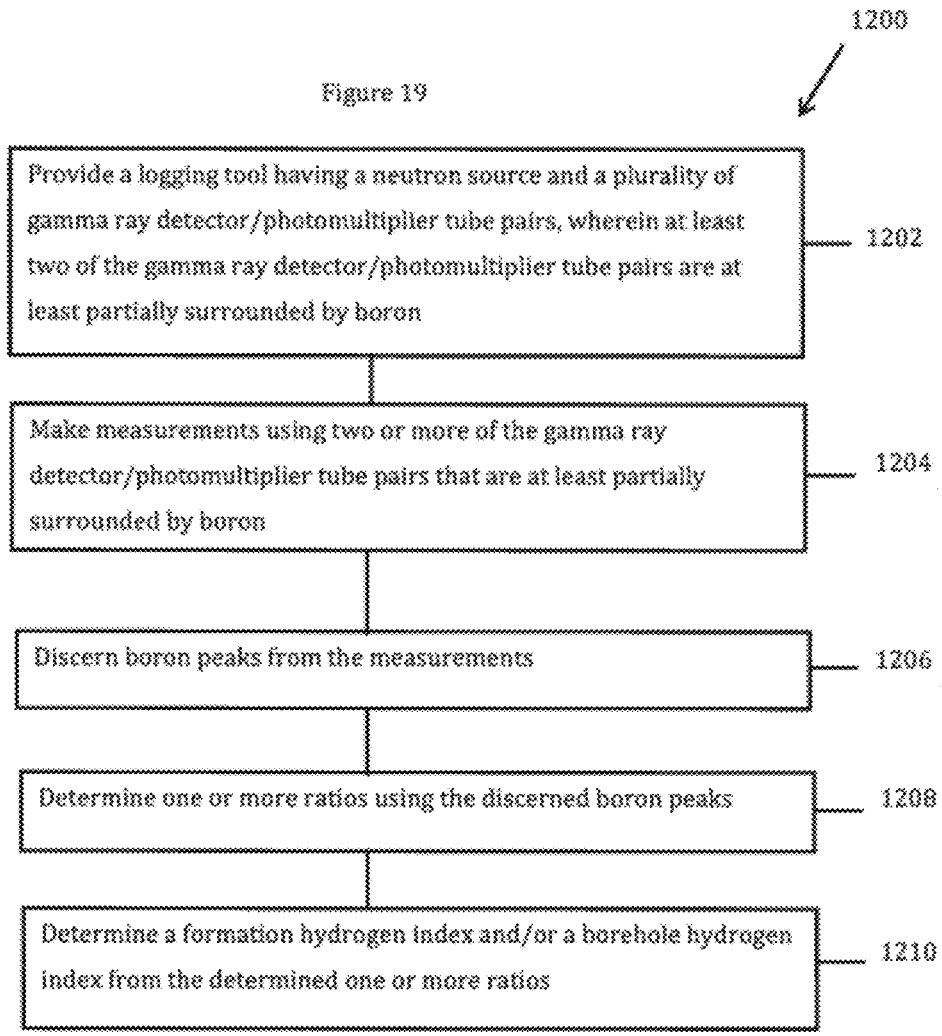

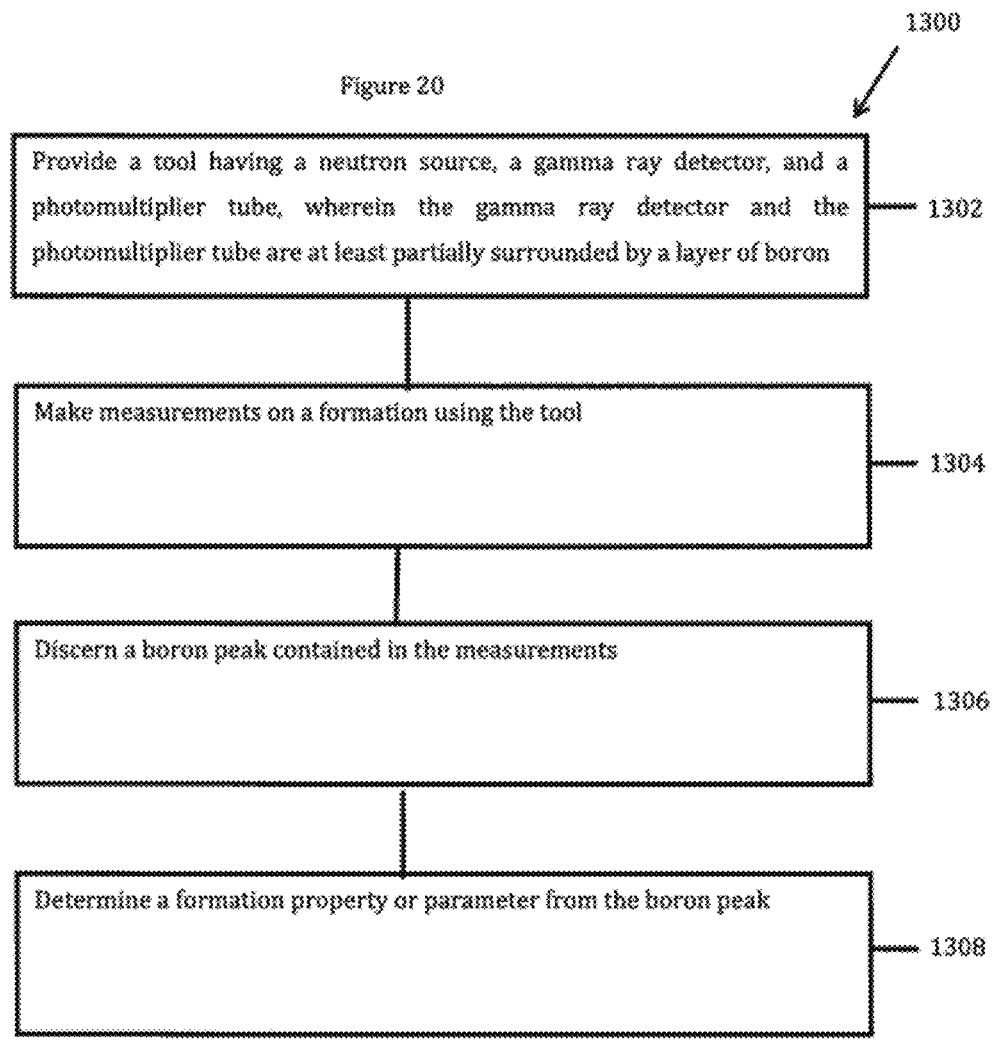

US 9,304,214 B2

NEUTRON DETECTION USING A SHIELDED GAMMA DETECTOR

RELATED APPLICATIONS

This application is, under 35 U.S.C. 120, a continuation-in-part application of co-pending patent application No. PCT/US11/41929, filed Jun. 26, 2011, which claims, under 35 U.S.C. 119(e), priority to and the benefit of U.S. Provisional Application No. 61/360,345, filed Jun. 30, 2010.

TECHNICAL FIELD

The invention relates generally to neutron detection based logging of geological formations, and more particularly to a boron shielded gamma ray detector configured for neutron detection.

BACKGROUND

Neutron detectors play an important role in downhole tools. At present, two kinds of neutron detectors are used in downhole tools. One type of detector serves to detect fast neutrons and may employ a plastic scintillation detector. A second, more common type is a detector of thermal or epithermal neutrons such as a $^3$He detector or, less frequently, a scintillation detector using $^6$Li-glass. $^3$He detectors are excellent detectors of thermal or epithermal neutrons and they are virtually insensitive to gamma-rays. $^6$Li-based detectors on the other hand have significant gamma-ray sensitivity and suppression or subtraction of gamma-ray induced background in the presence of gamma-rays from inelastic neutron interactions or neutron capture is difficult and inaccurate.

Neutron detection is used in a multitude of downhole tools. The basic application is in the measurement of neutron porosity through the detection of thermal or epithermal neutrons. Other applications may include the determination of neutron-gamma-density (see U.S. Pat. Nos. 5,608,215 and 5,804,820, assigned to the assignee of the present disclosure). In addition, the present scarceness of $^3$He, a gas which is widely used in thermal and epithermal neutron detectors, has made alternatives for neutron detection to be of great interest.

BRIEF DESCRIPTION OF THE DRAWINGS

FIGS. 6A and 6B show an alternative two-layer scintillator for enhanced neutron detection in accordance with embodiments of the present disclosure.

FIGS. 7A and 7B show an alternative segmented crystal with boron layers in accordance with embodiments of the present disclosure.

FIG. 14 shows one way to separate two partially overlapping peaks in measured boron-shielded data using a two-Gaussian peak fit plus a polynomial background, in accordance with the present disclosure.

FIG. 15 is a plot of the ratio of neutron count rates (boron peak areas) from two detectors at different axial distances from the neutron source as a function of formation porosity, in accordance with the present disclosure.

FIG. 17 is a plot of a boron measurement burst and capture window ratio of a single detector as a function of the borehole fluid sigma, in accordance with the present disclosure.

FIG. 18 is a flowchart showing an embodiment in accordance with the present disclosure.

FIG. 19 is a flowchart showing an alternative embodiment in accordance with the present disclosure.

FIG. 20 is a flowchart showing an alternative embodiment in accordance with the present disclosure.

DETAILED DESCRIPTION

Figure 1:
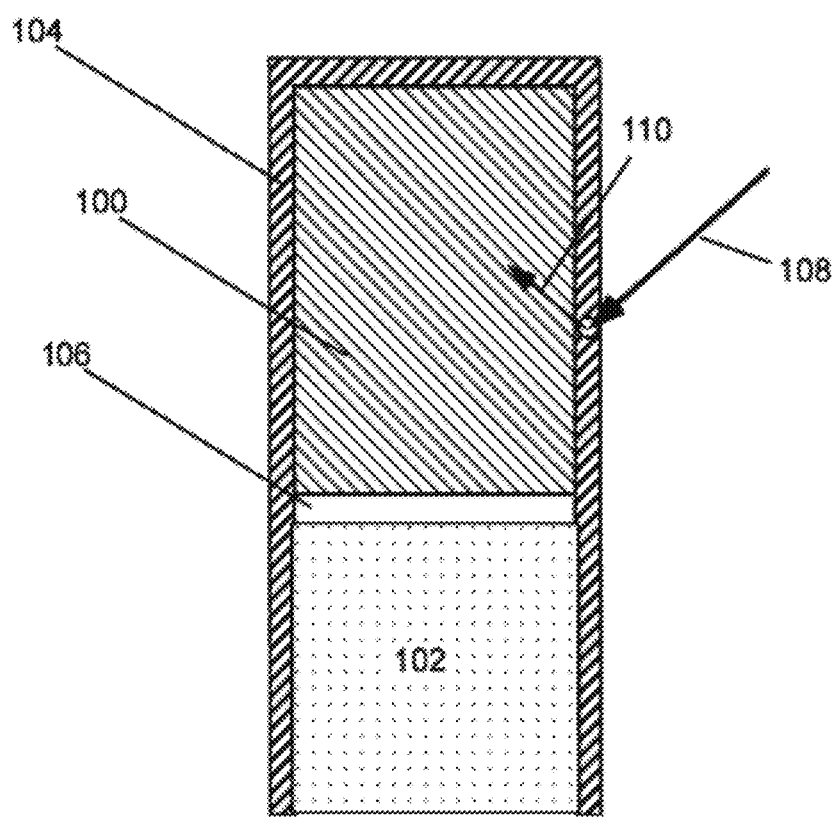
FIG. 1 shows a schematic of neutron detection according to the present disclosure.

In the following description, numerous details are set forth to provide an understanding of the present disclosure. However, it will be understood by those skilled in the art that the present invention may be practiced without these details and that numerous variations or modifications from the described embodiments are possible.

Here, we present an apparatus and method for detecting neutrons using a boron-shielded gamma-ray detector, which will detect the 0.48-MeV prompt gamma ray due to the $^{10}$B(n,α)$^7$Li reaction. The gamma ray detector can be a proportional gas counter, a scintillation based detector, or a semiconductor detector. Monoenergetic prompt gammas will produce a sharp peak in the pulse height spectrum of a gamma-ray spectroscopy detector. The count rate in the peak is proportional to the neutron interaction rate with the $^{10}$B isotope. Natural boron contains about 20% of $^{10}$B. If one surrounds a gamma detector with a layer containing $^{10}$B, one can measure the gamma signal and neutron signal at the same time and at the same physical location in an instrument. This technique requires very little effort to apply to many neutron logging tools with gamma detectors. In particular, the approach can be used to measure neutron porosity simultaneously with gamma-ray counting or spectroscopy at the same location as long as the 0.48 MeV gamma-ray from the neutron reaction does not interfere with the gamma-ray measurement.

A neutron is neutral in charge and therefore is not detectable in the same manner as a charged particle. One way to detect a neutron is to convert it into more readily detectable particles. For example, the $^{10}B(n, \alpha)^{7}Li$ reaction (shown below) is well known and well suited for this purpose. The large amount of energy shared by the $^{7}Li$ and alpha particles can ionize matter and generate electronic signals in a detector.

Different materials have different neutron absorption characteristics. Boron is a very good thermal neutron (i.e., neutrons having energy levels corresponding to around 0.025 eV) absorber due to the high absorption cross-section of $^{10}B$, which has a 19.8% abundance in natural boron. In addition, enriched boron is readily available to further increase the absorption probability. Thermal neutrons tend to diffuse randomly within a formation, without losing energy, until they are captured by the nuclei of atoms such as chlorine, hydrogen, or silica. The capturing nucleus becomes intensely excited and emits a high-energy gamma ray of capture. The thermal neutron interaction with $^{10}B$ is the $(n, \alpha)^{7}Li$ reaction shown in Equation 1 below.

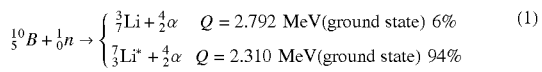

$$^{10}_{5}B + ^{1}_{0}n \rightarrow \begin{cases} ^{3}_{7}Li + ^{4}_{2}\alpha & Q = 2.792 \text{ MeV(ground state) } 6\% \\ ^{7}_{3}Li^{*} + ^{4}_{2}\alpha & Q = 2.310 \text{ MeV(ground state) } 94\% \end{cases} \quad (1)$$

This interaction will release a total energy of 2.792 MeV with the reaction product $^{7}Li$ in the ground state or 2.310 MeV with the $^{7}Li$ in the excited state. The latter reaction will happen 94% of the time. The $^{7}Li$ in the excited state will immediately decay to the ground state and release a "prompt" gamma ray with an energy of 0.48 MeV. The 0.48 MeV prompt gamma ray released in 94% of the $^{10}B(n, \alpha)^{7}Li$ reaction may be detected and therefore, by inference, used to detect thermal neutrons.

As stated above, it is well known that neutrons are neutral in charge and thus require conversion to detectable particles. One of the most popular thermal neutron conversion reactions is the $^{10}B(n,\alpha)^{7}Li$ reaction. The large amount of energy is shared by $^{7}Li$ and alpha particles, which can ionize matter and generate electronic signals in a detector. The most common use of the $^{10}B$ neutron reaction for neutron detection is in the $BF_3$ gas-proportional counter and, more recently, in proportional counters (straw detectors) with $^{10}B$ lined walls intended to replace $^{3}He$ detectors in several homeland security applications. The $BF_3$ neutron detector is well documented in text books and widely used in universities, laboratory and industry.

However, the 0.48 MeV gamma ray, which is present in 94% of the neutron reactions and can be easily detected by a modern gamma detector, has been ignored. The method disclosed herein is a method to detect thermal neutrons based on the 0.48 MeV prompt gamma from the $^{10}B(n,\alpha)$ reaction.

FIG. 1 shows a schematic of the neutron detection in accordance with an embodiment of the present disclosure. The gamma ray scintillation crystal 100 coupled to the window 106 of the photomultiplier tube 102 (PMT), is surrounded by a thin shielding layer containing boron 104. The thickness of the boron containing layer 104 should be sufficient to absorb almost all thermal neutrons. When a neutron 108 is absorbed by the boron containing layer 104, it will emit $^{7}Li$ and alpha particles and a gamma ray 110 94% of the time. The Li and alpha particles are heavy charged particles so that they can be easily shielded either by the boron shielding 104 itself, the thin detector housing, or the optical reflector typically surrounding a scintillation crystal 100, while the 0.48 MeV gamma ray will penetrate the boron containing shielding layer 104 and detector housing, and often deposit all its energy in the detector. Thus, the 0.48-MeV peak in the detector's gamma ray spectrum corresponds to neutrons absorbed in the boron containing shielding layer 104.

Figure 2:
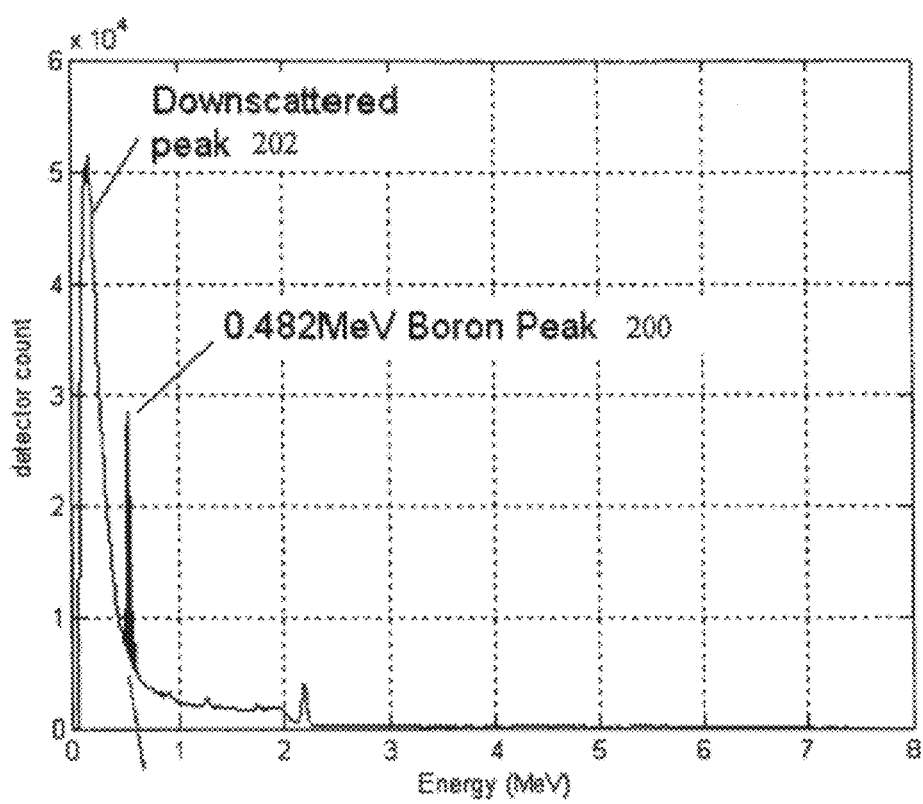
FIG. 2 shows a typical spectrum measured in a boron-shielded detector, with the boron peak highlighted.

Since this prompt gamma-ray is monoenergetic, it will produce a sharp peak in a detector with sufficient resolution. FIG. 2 shows a typical spectrum measured in a boron-shielded detector of FIG. 1, with the boron peak highlighted. One method of determining a signal that is representative of the neutron signal is to determine only the counts in the boron full energy peak, and separate the peak from the larger down-scattered continuum. This separation requires some basic fitting techniques, such as a polynomial fit and exponential fit, or another appropriate functional form to the part of the spectrum before and after the boron peak in order to subtract the background. FIG. 2 shows the boron peak 200 which is separated from the down-scattered section 202 of the spectrum. An alternate method is to sum all the counts in the boron energy window, which would give a higher count rate with better statistics, but would also have a significant contribution from gamma rays that would not be representative of thermal or epithermal neutrons interacting with the boron containing shielding layer 104 surrounding the scintillator 100. In the worst scenario, the boron peak 200 will have some contamination from other gamma rays, but its total area will remain dominated by the 0.48-MeV gamma-ray from the neutron interaction.

In most neutron induced gamma-ray spectra, there will be a prominent 511 keV gamma-ray line from the annihilation of positrons created by electron-positron pair production. With a detector of sufficient energy resolution, it is possible to separate the two lines located at 0.48 MeV and 0.511 MeV respectively. If the peaks overlap due to limited detector resolution, sophisticated fitting can be used to isolate the contribution from the two separate lines. This can be achieved by fitting two Gaussians and a background to the two peaks. The background may be assumed to be linear under the two peaks, but could have different form such as an exponential or a higher order polynomial. Standard spectra could also be used to separate the Boron peak from the 0.511 peak.

Figure 3:
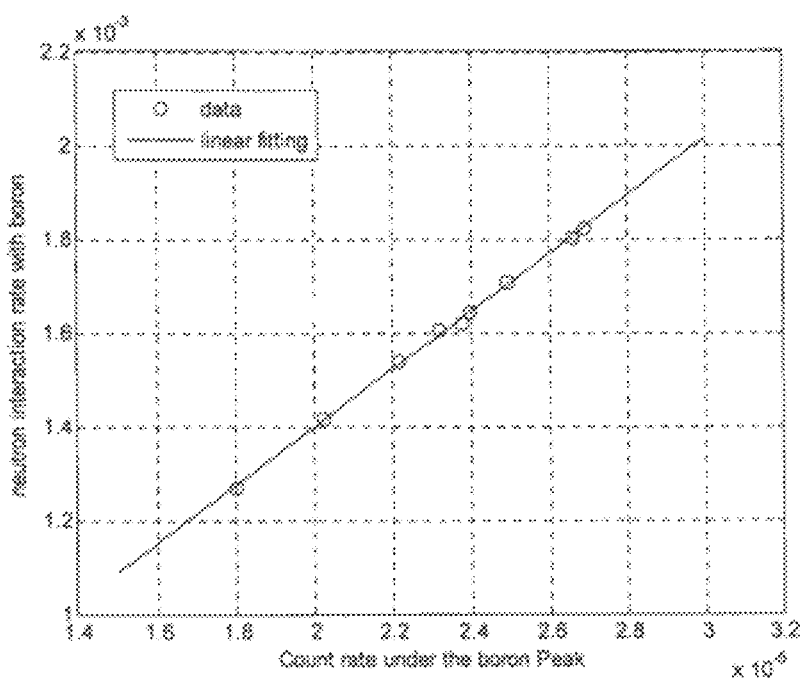
FIG. 3 shows a graph of neutron absorption rate in the boron shield plotted against the count rate under the boron peak in the gamma detector, in accordance with the present disclosure.

Using modeling techniques, we can calculate the neutron absorption rate in the boron shield 104 and the gamma detection probability in the detector surrounded by the boron shielding 104. We can separate the boron peak count rate from the rest of the spectrum using one of the methods mentioned above, and plot the boron peak count rate vs. the neutron absorption rate within the boron shield, as shown in FIG. 3. As shown clearly in FIG. 3, the boron peak is a linear function of the neutron absorption rate. Thus, it is a very good thermal and epithermal neutron measurement.

The detection efficiency is moderate compared to other neutron detection techniques. First of all, around 50% of the prompt gamma rays from boron will not enter the detector in this simple configuration. Secondly, the gamma rays entering the detector have a certain probability not to deposit all of their energy so that they will not all score in the full energy peak. To increase the efficiency, it is preferable to use a detector with a high peak-to-Compton ratio.

One benefit of this technique is that one can measure both the gamma and the neutron signal at the same time and location. Generally, for a given neutron logging tool with several gamma detectors, one can have both a gamma and a neutron measurement from a single detector using this technique, instead of only having a gamma ray measurement per detector. In addition, this technique requires very little effort to be implemented in a neutron logging tool with a gamma-ray detector. Providing the neutron measurement at the same time and location as the gamma-ray measurement, this technique can make it possible to measure neutron porosity, hydrogen index (HI), the macroscopic thermal neutron capture cross section (Sigma) of the borehole or the formation, gas saturation (based at least in part on inelastic gamma ray count rates), gamma ray spectroscopy (inelastic and capture) and other formation properties requiring the combination of neutron and gamma measurements. Details regarding such measurements can be found in books such as: D. V. Ellis and J. M. Singer, "Well Logging for Earth Scientists", second edition, Springer 2007.

Another benefit of this technique is that a scintillation detector can be simultaneously optimized for both inelastic gas detection and inelastic and capture spectroscopy (U.S. Application PCT/US10/35718). If a detector with a low resonance integral, such as $LaCl_3$ is shielded with a layer of boron, it improves the spectroscopy performance by removing the background from most thermal neutron interactions that may occur directly in the detector and that may mask the high energy inelastic and capture gamma rays returning from the formation. Most of these interactions now occur in the Boron layer and the resulting gamma-rays leave at most 0.48 MeV in the detector. These neutron induced interactions are still counted in the total counts during the neutron burst which are typically used for the inelastic gas measurement. By applying an energy cutoff to the total counts above 0.48 MeV and preserving the higher energy counts for the inelastic gas measurement, a single detector can be optimized simultaneously for both measurements. Alternatively, one can attempt to subtract the contribution based on the capture gamma-ray count rate observed after the burst. In a third approach, the subtraction of the gamma-ray counts during the burst could be based on the total count rate in the peak and could include subtracting the contribution of lower energy signals caused by incomplete absorption of the 0.48-MeV gamma ray in the detector or by 0.48 MeV gamma-rays recorded in the detector after scattering in the material surrounding the detector or the logging tool. This could be done by measuring a standard spectrum corresponding to the 0.48-MeV gamma-rays interacting with the crystal. From the total counts in the peak, the number of lower energy counts corresponding to partial energy deposition in the crystal or to backscattering from the material surrounding the detector can be determined.

The neutron detector described here presents a thermal neutron detector. It could be transformed into an epithermal neutron detector by surrounding the Boron layer 104 by a layer of a different neutron absorber, so that only epithermal neutrons will reach the boron layer 104. Such a neutron absorber could comprise a material such as Cd or Gd. A preferred solution would be the use of a layer containing a high concentration of $^6Li$. The advantage of $^6Li$ as an absorber is that the reaction $^6Li(n,\alpha)^3H$ does not result in the emission of gamma-rays and therefore the interaction would not be detected in the scintillation detector, provided that the charged particles created in the reaction do not reach the scintillating material.

Alternatively, the detector could be made directionally sensitive for neutrons by covering a particular part of the scintillator with a layer of boron, while another part would not be covered or would be covered by a different neutron absorber such as Cd, Gd, or $^6Li$.

The tool may be conveyed on wireline, slick-line, drill-pipe (TLC) or coiled tubing or may be part of a bottom hole assembly in a drill string, as part of the basic wellsite system as disclosed and referenced above in U.S. Application PCT/US10/35718. The tool will contain the necessary electronics to acquire data from the detector(s) and to store them in memory and/or transmit them to the surface (wireline, wired drill pipe, mud pulse and other means of communication to the surface).

Figure 4:
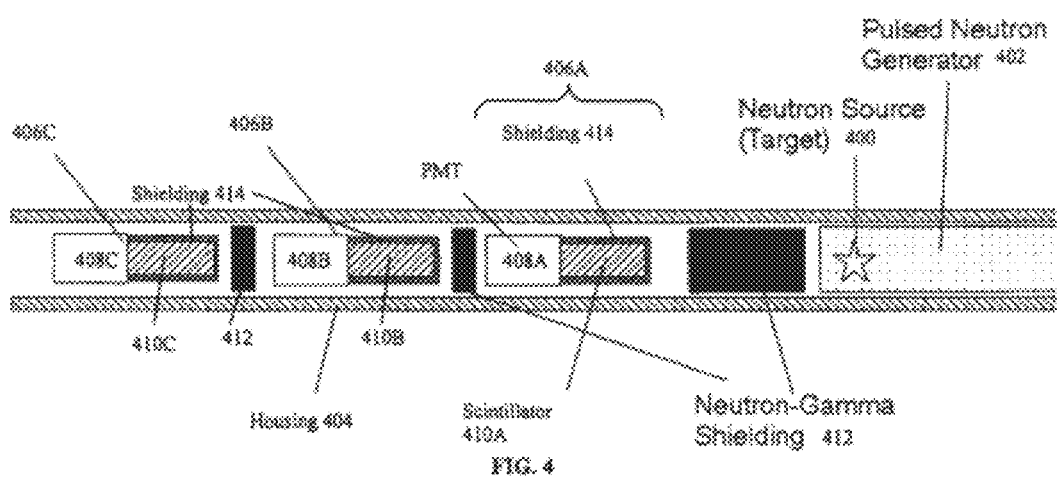
FIG. 4 shows a basic tool using the method of the invention.

FIG. 4 shows a downhole tool in accordance with an embodiment of the disclosure. The downhole tool includes a pulsed neutron source 400 (a radioisotope source like $^{241}AmBe$ or $^{252}Cf$ could be used for many applications as well) disposed in a pulsed neutron generator 402, within a tool housing 404. The tool also includes a plurality of detectors 406A, B, and C, respectively, each detector including a photomultiplier 408A, B, and C, and scintillation crystal 410A, B, and C, respectively. Neutron-gamma shielding 412 is disposed between the source and the detectors and three scintillation detectors as described above. While all three detectors in FIG. 4 are shown as being surrounded by $^{10}B$ shielding, only one or two of the detectors may be constructed with this shielding.

Also, for some applications a single detector, possibly combined with a neutron monitor could be used. The term "neutron monitor" is intended as a detector placed to measure fast neutrons substantially immediately upon being emitted from the neutron generator 402 to obtain a measurement of the neutron flux from the neutron source. This would allow the construction of a tool with a single detector, which would perform a combined neutron-gamma measurement as described in U.S. Pat. No. 7,365,307, commonly assigned to the assignee of the present disclosure. The number of detectors is not limited to three, as additional detectors can be used. Also, some of the detectors can be neutron detectors (such as $^3He$ detectors).

In some applications, the neutron flux detected by the detector of the invention may be used to obtain a correction signal to determine the total amount of tool background gamma-rays created in the tool housing and other materials surrounding the detector.

In the detector shown in FIG. 1, the scintillator and part of the photomultiplier are surrounded by a layer containing $^{10}B$. However, the detection probability for gamma-rays from the shielding covering the PMT drops rapidly as the distance to the scintillator increases. Scintillators used may be known scintillating materials, including but not limited to, Sodium Iodide (NaI), Lanthanum Chloride ($LaCl_3$), Lanthanum Bromide ($LaBr_3$), Yttrium Aluminum Perovskite (YAP), Gadolinium-oxyortho-slicate (GSO), and Bismuth Germanate (BGO), to name a few.

Figure 5:
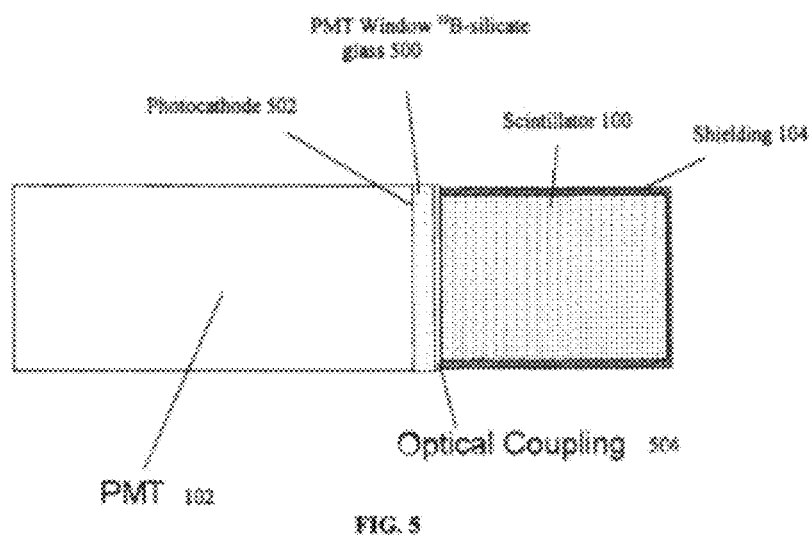
FIG. 5 shows a schematic of a scintillator surrounded by $^{10}$B shielding except on the PMT side, the PMT having an entrance window with high $^{10}$B content.

Alternatively, the construction shown in FIG. 5 could be used. As shown in FIG. 5, the PMT window may contain $^{10}B$ and may act as a converter to emit gamma-rays. If a hygroscopic scintillator 100 that requires hermetic encapsulation is used, then the exit window from the scintillator 100 (not shown) could be made of a glass window 500 containing a high concentration of $^{10}B$. A transparent optical coupling 504 containing $^{10}B$ may be placed between the PMT 102 and the scintillator 100.

While the invention has been described as using a PMT 102 for the photon detection, any other photodetector suitable for the application could be used in conjunction with the scintillator.

While the invention has been described as using a scintillator to detect the gamma-rays, other gamma-ray detectors such as semi-conductor detectors (e.g., Germanium detectors, Cadmium Zinc Telluride (CZT), and Mercuric Iodide (HgI), to name a few) or gas proportional counters (like Xe-proportional counters) could be surrounded by $^{10}B$ in a similar way.

For an inelastic gas measurement as disclosed and referenced above in U.S. Application PCT/US10/35718, an alternative method for achieving a low epithermal background during the burst is to use a boron shielded detector with a scintillator material having a low resonance integral and using a cutoff energy in the acquired gamma-ray spectrum, which is higher than the 0.48 MeV boron peak. The prompt gamma rays from boron thermal neutron absorption are only counted at energy levels equal or lower than the 0.48 MeV. In addition, almost no thermal neutrons can penetrate the boron shielding and generate gamma rays within the detector. Thus, the counts with energy levels higher than the 0.48 MeV boron peak will have a much lower percentage of thermal neutron capture gamma rays generated in the scintillator, and a relatively larger percentage of inelastic gamma rays. This will make the inelastic measurement during the neutron burst less sensitive to thermal and epithermal neutrons, which respond primarily to hydrogen content. Therefore, it can be used to better differentiate gas porosity from water porosity.

The methods of the present disclosure provide a manner of measuring the thermal and epithermal neutron population during the neutron burst. For the inelastic gas measurement, the inelastic measurement during the neutron burst contains the gamma rays from neutron inelastic scattering, as well as some epithermal neutron and thermal neutron prompt gamma rays. Since one can use this method to measure those epithermal and thermal neutron signals during the burst at the same detector, one can also use this measurement to remove the epithermal and thermal neutron signal from the measurement during the neutron burst and to obtain a cleaner measurement of the gamma rays from neutron inelastic scattering. This clean inelastic measurement is an independent measurement to the thermal neutron measurement after the neutron burst. Thus, the two can be used together to differentiate the gas filled porosity from water filled porosity.

The 0.48 MeV boron peak will generally be present in the detector when neutrons are also present. Therefore, one can use it to regulate the detector gain to make sure the boron peak will always appear in the same energy channel. In this way, there is no need to have a radio-isotope source, such as a $^{137}$Cs, inside the tool. This can be a step towards a fully sourceless tool (i.e. a tool not containing any radioisotope sources) and it can also make it easier to gain regulate a tool that is not communicating with uphole equipment and does not have a large amount of processing power.

Using proper upper and lower energy thresholds just above and below the boron peak, one can measure the MCS time spectrum of the boron peak. This time spectrum corresponds to epithermal and thermal neutron absorption in the boron shielding. Thus, it can be used to measure the formation and/or borehole Sigma. The time spectrum could also be used to calculate an epithermal slowing-down time which is commonly used as an indicator for tool standoff.

Since the MCS spectrum mentioned above corresponds to a neutron measurement, the apparent Sigma based on this spectrum will be different from the apparent Sigma measured from the capture gamma ray time spectrum (i.e. the MCS spectrum associated with energies above 0.48 MeV). The difference can be used in terms of depth-of-investigation, borehole size effect, borehole salinity effect, casing size effect, cement effect, lithology effect, HI effect, and gas effect. Thus, the apparent Sigma based on the boron peak in the spectrum can be a stand-alone Sigma measurement, or can be used to correct the gamma-ray-based Sigma for environmental effects.

For a logging tool with two or more detectors with boron shielding, the ratio of the boron peak measurements from any two detectors can be used to measure the formation and borehole HI. One can also use a ratio of the boron peak measurement from one detector and a capture gamma ray measurement from another detector to measure the formation and borehole HI. These HI measurements are different from the HI measurement based on the capture gamma ray ratio in terms of depth-of-investigation, borehole size effect, borehole salinity effect, casing size effect, cement effect, lithology effect, and gas effect. Thus, these HI measurements can be stand-alone HI measurements, or be used to correct those effects for the HI measurement based on the capture gamma ray ratio.

The boron peak measurement in the detector can be used as an independent count rate to normalize another detector output in order to cancel the absolute neutron output from a pulsed neutron generator which may not be always constant. It can be used to normalize not only the output from another detector, but also the measurements from the current detector itself.

This disclosure also provides a method to measure thermal and epithermal neutrons entering the boron shielding. Such a neutron measurement can be used for other applications which are not mentioned above.

Additional thermal neutron absorbers such as $^6$Li can be added outside the boron shielding to absorb most thermal neutrons and allow some epithermal neutrons to pass through and reach the boron shielding. Thus, the 0.48 MeV prompt gamma rays measured in the detector correspond to the epithermal neutrons only but not the thermal neutrons. This provides a method to measure the epithermal neutrons only. This measurement can be used for the applications mentioned above in addition to others not listed.

The methods herein provide a neutron measurement at the exact same location and time of the gamma detector.

A lead or other heavy metal shield around a Boron wrapped scintillator could be used to improve the signal-to-noise ratio for neutron detection. This can make it a more pure neutron detector, or if the detector is in a high count rate environment, it can be used to increase detection of neutrons versus gamma rays. The preferred reduction of low energy gamma rays coming from the formation can also facilitate the extraction of the neutron signal from the spectrum.

The gamma ray detector can be only partially covered in Boron (e.g. the top or bottom half axially or the front or back half azimuthally) to tune the sensitivity for neutron detection to a different depth of investigation or to alter the sensitivity to the borehole or formation. This technique could, for instance, be used to correct for borehole effects. For azimuthal measurements, it may be necessary to cover the opening in the boron layer with a different neutron absorbing material. Otherwise thermal neutrons entering a scintillation detector with a low neutron capture cross section from the open side will have a high probability of getting absorbed in the shielding on the opposite site. This would greatly reduce the azimuthal sensitivity.

In comparison to presently used Pulsed-Neutron-Capture tools, i.e. tools that measure the macroscopic thermal neutron capture cross section of the formation (Sigma) and/or the borehole (Sigma-Borehole), the apparatus of the present disclosure makes it possible to measure a Sigma, which is virtually free of contributions from neutron capture in the detector and therefore represents a true gamma-ray sigma with the associated deeper depth of investigation. At present, all gamma-ray detector based sigma tools exhibit a mix of signals that comprises neutrons interacting with the tool and with the scintillation crystal (and its shielding) and gamma-rays that are due to neutron capture in the formation and the borehole. Due to the shallower depth of investigation associated with the neutron-neutron based sigma, this increases the borehole contribution and the required borehole correction. This is possible with the apparatus of the present disclosure, if one sets the gamma-ray threshold above 0.48 MeV and if the gamma-ray contribution from neutron capture in the tool is small. The latter can be achieved by proper selection of materials and additional shielding.

In the embodiments described so far, at least 50% of the gamma-rays will not interact with the scintillator. This can be changed by using multiple/segmented scintillators as indicated in FIGS. 6A and B, 7A and B, and 8. FIG. 6A shows a scintillator consisting of two portions: an inner cylindrical scintillator 600 (though other shapes are equally plausible) and a cylindrical outer scintillator 602 on the outside with a boron layer 604 separating the two, along with an end layer of boron 606. FIG. 6B shows an end view of the configuration of FIG. 6A without an end layer. If the scintillator on the outside is dimensioned in such a way as to insure that most of the 0.48-MeV gamma-rays deposit all their energy, then a significant increase in the neutron sensitivity can be achieved. However, the complex shape of the scintillator and the fact that it is read by a single PMT may compromise the spectral quality (spectral resolution of the assembly). Also, the scintillator should have only a very small neutron capture cross section and resonance integral. The neutron detection probability can be enhanced further by adding a B-layer at the end of the scintillator. However, this layer will have a reduced probability that the 0.48 MeV gamma-ray will be detected. Additionally, the PMT window can be made of a boron-glass (i.e. Borosilicate) possibly made with enriched $^{10}B$.

An alternate embodiment is shown in FIGS. 7A and 7B. As shown in FIGS. 7A and 7B, the scintillator is separated into a plurality of segments 700 (four as shown, 700A, 700B, 700C, and 700D respectively), each of which are separated from the adjacent segments by thin layers of boron 702. Each boron layer is in addition to proper reflectorizing of the scintillator surfaces to minimize light losses. As with the embodiment shown in FIGS. 6A and 7B, an end layer of boron 704 may also be included.

Figure 8:
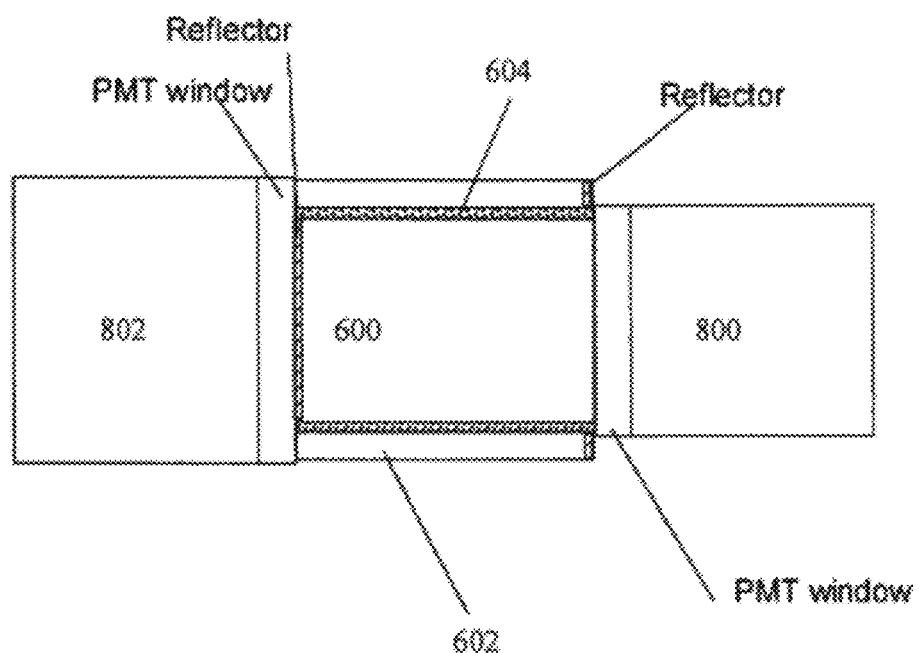
FIG. 8 shows an alternative scintillator configuration having two PMTs to optimize spectral performance in accordance with embodiments of the present disclosure.

In yet another embodiment, the output of the scintillator(s) could be captured by two PMTs 800 and 802 respectively on opposing sides of the segmented scintillator with an inner scintillator segment 600 and an outer scintillator segment 602 separated by a boron layer 604 as shown in FIG. 8. In addition to the reflecting material typically used surround a scintillation crystal, the opposing ends are reflectorized to ensure that light passes to one or the other of the PMTs 800 and 802.

Figure 9:
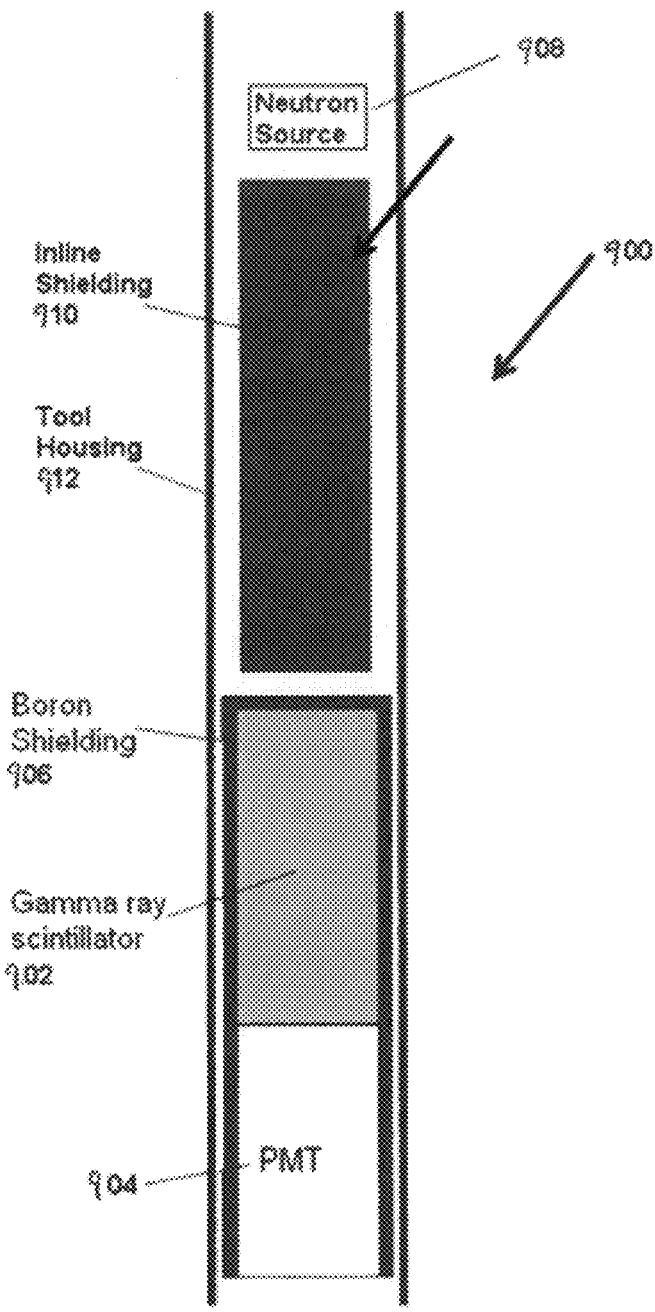
FIG. 9 schematically shows one embodiment of a neutron detector, in accordance with the present disclosure.

FIG. 9 schematically shows another embodiment of a down-hole logging tool 900 that uses a boron-shielded neutron detector, similar to that of FIG. 1. A gamma ray detector (scintillator) 902 and a photomultiplier tube (PMT) 904 are covered by a thin layer of boron 906. The thickness of the boron layer 906 should be sufficient to absorb almost all thermal neutrons. A pulsed neutron source or a radioisotope source such as $^{241}AmBe$ or $^{252}Cf$ could be used as a source of neutrons 908. There is an inline shield 910 between neutron source 908 and detector 902. Inline shield 910 is generally made from a heavy metal, such as tungsten. In some applications the in-line shield 910 may contain hydrogenous materials such as titanium hydride, plastics, silicones, etc., which may be mixed with neutron absorbers such as $^{10}B$, $^6Li$, Cd, Gd, to name a few. The in-line shield 910 may also be a combination of high-density material like tungsten, hydrogenous material, and neutron absorbers. The neutron source 908, inline shield 910, and gamma ray detector 902 are within a pressure housing 912.

Figure 10:
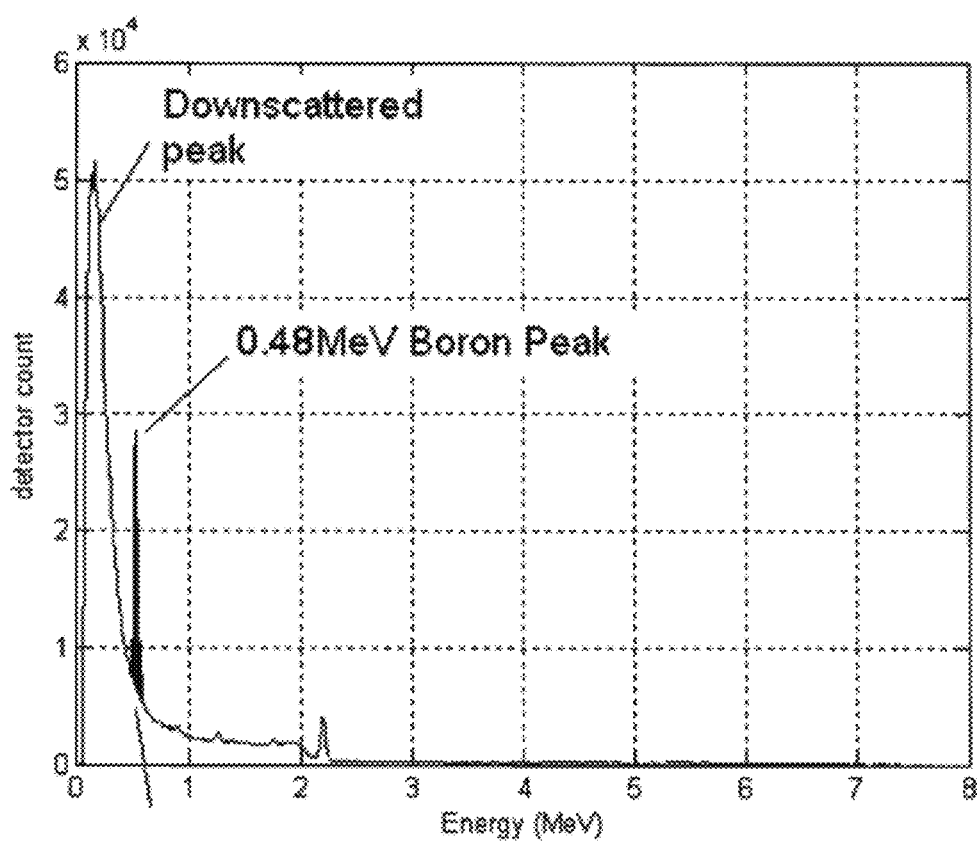
FIG. 10 is an example plot of the number of detected gamma rays versus the energies of the detected gamma rays, similar to that in FIG. 2.
Figure 11:
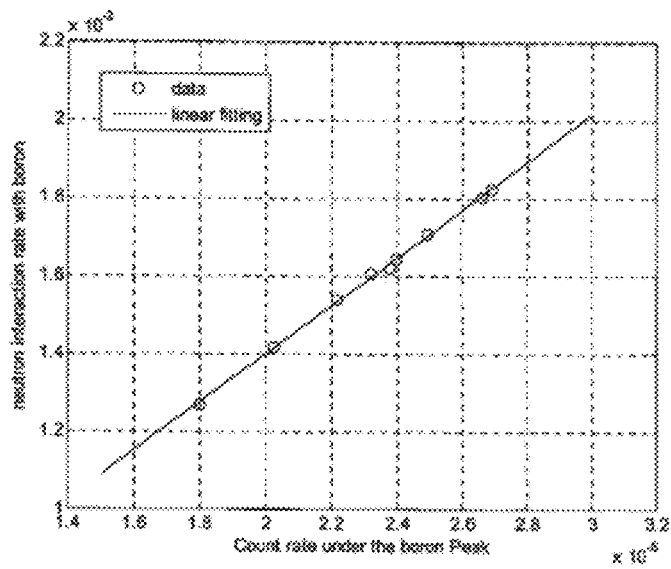
FIG. 11 is a example plot of the neutron interaction rate with boron versus the count rate under the boron peak, as disclosed in the parent application.

FIG. 10 is a plot similar to FIG. 2 showing a spectrum measured by downhole tool 900 having a boron-shielded detector. FIG. 10 shows the boron peak separated from the down-scattered part of the spectrum. An example of the boron peak count rate separated from the rest of the spectrum using one of the above-mentioned methods is shown in FIG. 11, again showing the area of the boron peak is a linear function of the neutron absorption rate, and thus a very good thermal and epithermal neutron measurement.

Figure 12:
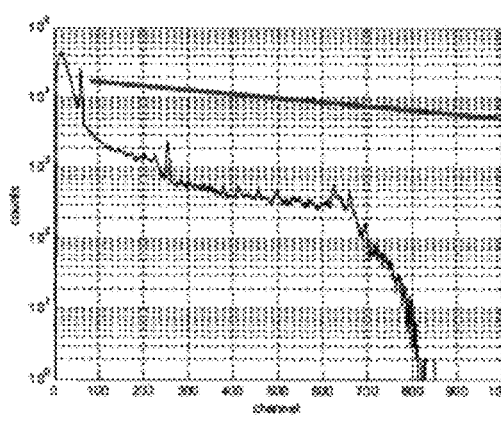
FIG. 12 is an example plot of a gamma-ray energy spectrum measured using a boron-shielded LaBr detector and a pulsed neutron source in an eight inch, water-filled borehole in a zero porosity unit (p.u.) sandstone formation, in accordance with the present disclosure.
Figure 13:
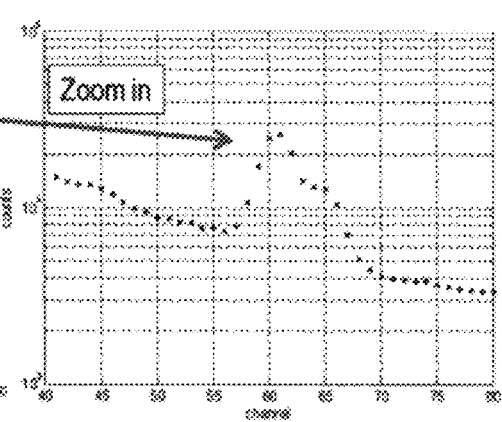
FIG. 13 is a plot of an enlargement of a particular portion of FIG. 12.

FIG. 12 shows a gamma-ray energy spectrum measured using a boron-shielded LaBr detector and a pulsed neutron source in an eight inch, water-filled borehole in a zero porosity unit (p.u.) sandstone formation. The zoom-in plot in FIG. 13 shows two adjacent peaks that partially overlap. One is due to the 0.48 MeV prompt gamma rays from neutron capture in $^{10}B$; the other is due to 0.511 MeV gamma rays from electron-positron annihilation. Those two types of gamma rays are always present under these circumstances. To obtain the neutron capture rate in the boron shield, one needs to separate those two gamma ray peaks.

FIG. 14 shows one way to separate the 0.48 MeV boron and the 0.511 MeV annihilation peaks using a two-Gaussian peak fit plus a polynomial background. The amplitude of the boron peak is directly proportional to the neutron capture rate in the boron shield and therefore representative of the thermal and epithermal neutron flux at the detector location. In this example, the resolution (full width at half maximum or FWHM) of the boron peak is 5.9%. The energy scale is eight MeV for 1024 channels. The precision of the boron amplitude after fitting is 1.15% for a one-second measurement, which is equivalent to about 7500 counts/s. The boron measurement at this count rate can provide useful neutron measurements with sufficient statistics.

Among other things, the boron neutron detection can be used to measure formation porosity in the same way as the traditional neutron porosity measurement using $^3He$-detectors. FIG. 15 shows the ratio of neutron count rates (boron peak areas) from two detectors at different axial distances from the neutron source as a function of formation porosity. This ratio is a strong function of formation porosity, thus it can be used to measure formation porosity. Since this measurement is essentially a thermal neutron measurement, it will have lithology and salinity dependency similar to the traditional neutron porosity measurement. Compared to a formation porosity measurement based on gamma ray detection, i.e., using the ratio of gamma-ray count rates in the absence of a boron shield, the neutron measurement is shallow in term of depth of investigation. Therefore, the porosity determined using the boron measurement will have different standoff, borehole fluid, borehole size, salinity, and lithology effects than a porosity determined from a gamma ray measurement. The boron measurement can be used as a stand-alone porosity measurement or as a measurement complementing a gamma ray based measurement, providing corrections for the gamma-ray based porosity measurement in terms of standoff, borehole fluid, borehole size, salinity, or lithology effects.

Figure 16:
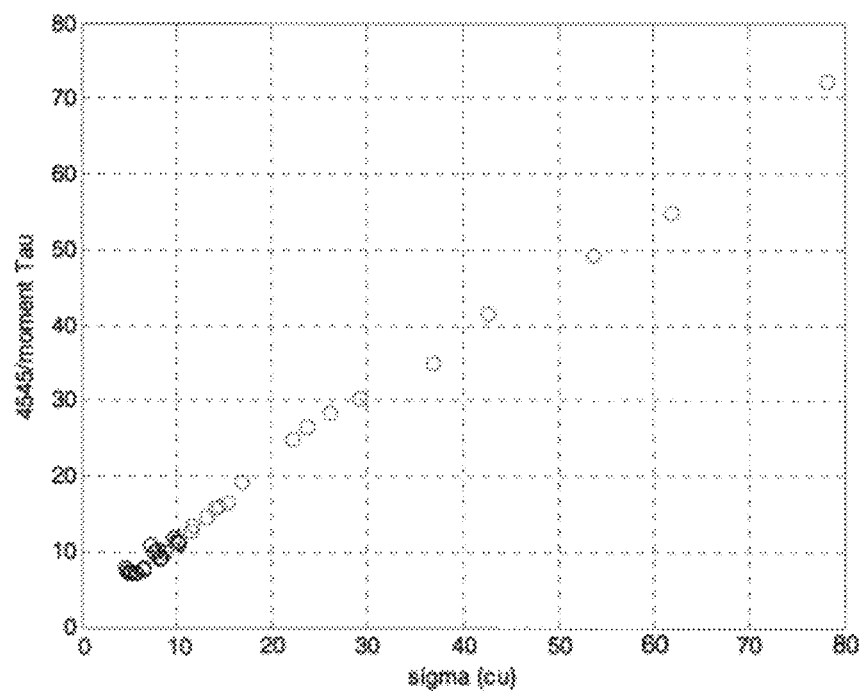
FIG. 16 is a plot showing an estimated sigma, which is computed from a decay constant using the moments method as a function of formation sigma, in accordance with the present disclosure.

The boron measurement can be also used for a formation sigma measurement. If one obtains the neutron count rate from the boron peak as a function of time, one can measure formation sigma based on the decay rate of the boron count rate. FIG. 16 shows an estimated sigma, which is computed from the decay constant tau using the moments method (details can be found in U.S. Pat. Nos. 4,600,838 and 5,420,422) as a function of formation sigma. Since the boron measurement is essentially a neutron measurement, the formation sigma based on boron will be shallower than one based on gamma ray detection. Therefore, the boron measurement can be used as a stand-alone sigma measurement, or to provide corrections for a gamma ray based sigma measurement in terms of standoff, borehole fluid, borehole size, salinity, invasion, or lithology effects.

Due to the limited count rate, a boron measurement with a fine timing sampling rate may not be available with sufficient statistics. However, the formation sigma can also be measured using a very coarse timing sampling rate. In the extreme case, we could use only two timing bins, early and late. The ratio of the early and late boron measurement is a strong function of formation sigma. Similar to the above, it can be used as a stand-alone sigma measurement or to provide corrections for the sigma measurement in terms of standoff, borehole fluid, borehole size, salinity, or lithology effects.

The boron measurement can also be used for borehole fluid sigma measurement. During a neutron burst, both epithermal and thermal neutrons may contribute to the boron measurement. After a neutron burst (in the so-called capture window), epithermal neutrons disappear rapidly and only thermal neutrons remain. Therefore, the burst-to-off burst ratio of boron count rate ratios represents an epithermal to thermal neutron ratio. FIG. 17 shows the boron measurement burst and capture window ratio of a single detector as a function of the borehole fluid sigma. Clearly, this ratio is a strong function of borehole sigma. It also has porosity and formation salinity effects, as shown in FIG. 17. Different detector spacings will provide different burst-to-capture ratios, which behave differently in terms of borehole and formation conditions. One could use several burst-to-capture ratios from different detectors to cancel the formation porosity and salinity effects and to get an uncontaminated borehole sigma measurement.

FIG. 18 is a flowchart showing one embodiment 1100 in accordance with this disclosure. A tool having a neutron source, a gamma ray detector, and a photomultiplier tube is provided (1102), wherein the gamma ray detector and the photomultiplier tube are at least partially surrounded by a layer of boron. Measurements are made using the tool (1104), and the number of prompt gamma rays emitted by the boron are determined from the measurements (1106). The number of neutrons detected are inferred using the determined number of prompt gamma rays (1108).

FIG. 19 is a flowchart showing an alternative embodiment 1200 in accordance with this disclosure. A logging tool having a neutron source and a plurality of gamma ray detector/photomultiplier tube pairs is provided (1202), wherein at least two of the gamma ray detector/photomultiplier tube pairs are at least partially surrounded by boron. Measurements are made using two or more of the gamma ray detector/photomultiplier tube pairs that are at least partially surrounded by boron (1204), and boron peaks are discerned from the measurements (1206). One or more ratios are determined using the discerned boron peaks (1208), and a formation hydrogen index and/or a borehole hydrogen index is determined from the determined one or more ratios (1210).

FIG. 20 is a flowchart showing an alternative embodiment 1300 in accordance with this disclosure. A tool having a neutron source, a gamma ray detector, and a photomultiplier tube is provided (1302), wherein the gamma ray detector and the photomultiplier tube are at least partially surrounded by a layer of boron. Measurements are made on a formation using the tool (1304), and a boron peak contained in the measurements is discerned (1306). A formation property or parameter is determined from the boron peak (1308).

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method, comprising:
   providing a tool having a neutron source, and a gamma ray detector, wherein the gamma ray detector is at least partially surrounded by a layer of boron;
   making measurements using the tool, wherein said measurements comprise prompt gamma rays emitted by the boron and gamma rays emitted by surrounding environment external to the tool;
   determining from the measurements the number of prompt gamma rays emitted by the boron; and
   inferring the number of neutrons detected using the determined number of prompt gamma rays, wherein inferring the number of neutrons comprises relating a neutron/boron interaction rate to a count rate of the prompt gamma rays to obtain the inferred number of neutrons.

2. The method of claim 1, wherein the tool is a logging tool.

3. The method of claim 2, comprising delineating a porous formation and determining the porosity of the porous formation.

4. The method of claim 1, wherein the prompt gamma rays have approximately 0.48 MeV of energy.

5. The method of claim 1, wherein the prompt gamma ray is a decay product from a neutron/boron interaction.

6. The method of claim 5, wherein the neutron is a thermal neutron or an epithermal neutron.

7. The method of claim 1, comprising measuring gamma ray signals and neutron signals at the same time and at the same location.

8. The method of claim 7, comprising determining one or more of a hydrogen index, a capture cross-section (Sigma), a gas content, and a gamma ray spectroscopy.

9. The method of claim 7, comprising simultaneously optimizing the gamma ray detector for gas detection and for spectroscopy.

10. The method of claim 1, comprising:
    providing a layer of neutron absorbing material different from boron at least partially surrounding the layer of boron; and
    detecting gamma rays only from epithermal neutron/boron interactions.

11. The method of claim 1, comprising:
    using the gamma ray detector to measure, in addition to measuring gamma rays produced from neutron inelastic scattering, a thermal neutron signal and an epithermal neutron signal during a neutron burst; and removing the epithermal neutron signal and the thermal neutron signal from the measurement of the gamma rays to produce a less noisy measurement of the gamma rays.

12. The method of claim 11, wherein the tool is a logging tool, and comprising differentiating a gas-filled porous formation from a water-filled porous formation.

13. The method of claim 1, comprising regulating a gain of the gamma ray detector.

14. The method of claim 1, comprising summing all the counts in a boron energy window to provide a higher count rate, and using the higher count rate to infer the number of neutrons detected.

15. The method of claim 1, comprising:
measuring the multichannel scalar time spectrum of the boron peak; and
determining a formation capture cross-section and/or borehole capture cross-section.

16. The method of claim 15, comprising correcting a gamma ray based capture cross-section for the depth of investigation and/or for environmental effects.

17. A method, comprising:
providing a logging tool having a neutron source and a plurality of gamma ray detectors, wherein at least two of the gamma ray detectors are at least partially surrounded by boron;
making gamma-ray count rate measurements using two or more of the gamma ray detectors that are at least partially surrounded by boron, wherein said measurements comprise prompt gamma rays emitted by the boron and gamma rays emitted by surrounding environment external to the tool;
discerning gamma-ray count rate boron peaks from the measurements;
determining one or more ratios of the discerned gamma-ray count rate boron peaks; and
determining a formation hydrogen index and/or a borehole fluid hydrogen index from the determined one or more ratios.

18. The method of claim 17, comprising correcting a capture gamma ray based hydrogen index measurement for the depth of investigation and/or environmental effects.

19. The method of claim 17, comprising normalizing one of the plurality of gamma ray detectors or self-normalizing the gamma ray detector from which the boron peak is measured.

20. A method, comprising:
providing a tool having a neutron source and a gamma ray detector wherein the gamma ray detector is at least partially surrounded by a layer of boron;
making measurements on a formation using the tool, wherein said measurements comprise prompt gamma rays emitted by the boron and gamma rays emitted by the formation;
discerning a boron peak contained in the measurements; and
determining a formation property or parameter from gamma rays emitted by the formation and the boron peak.

21. The method of claim 20, wherein the formation property or parameter comprises porosity, formation sigma, or borehole fluid sigma, or any combination thereof.

22. The method of claim 21, comprising using the determined formation property or parameter as a stand-alone porosity measurement or as a measurement complementing a gamma ray based measurement.

23. The method of claim 22, wherein the using the formation property or parameter as a complementary measurement comprises providing corrections to a gamma ray based measurement for standoff, borehole fluid, borehole size, salinity, and/or lithology effects.

24. The method of claim 20, wherein the neutron count rate is a function of only two times.

25. The method of claim 20, comprising measuring a fast neutron flux from the neutron source using a neutron monitor detector.

26. The method of claim 25, comprising normalizing a boron-10 gamma-ray count rate using the measured fast neutron flux.

27. The method of claim 20, further comprising obtaining a neutron count rate from the boron peak as a function of time.

* * * * *